Patented Jan. 18, 1927.

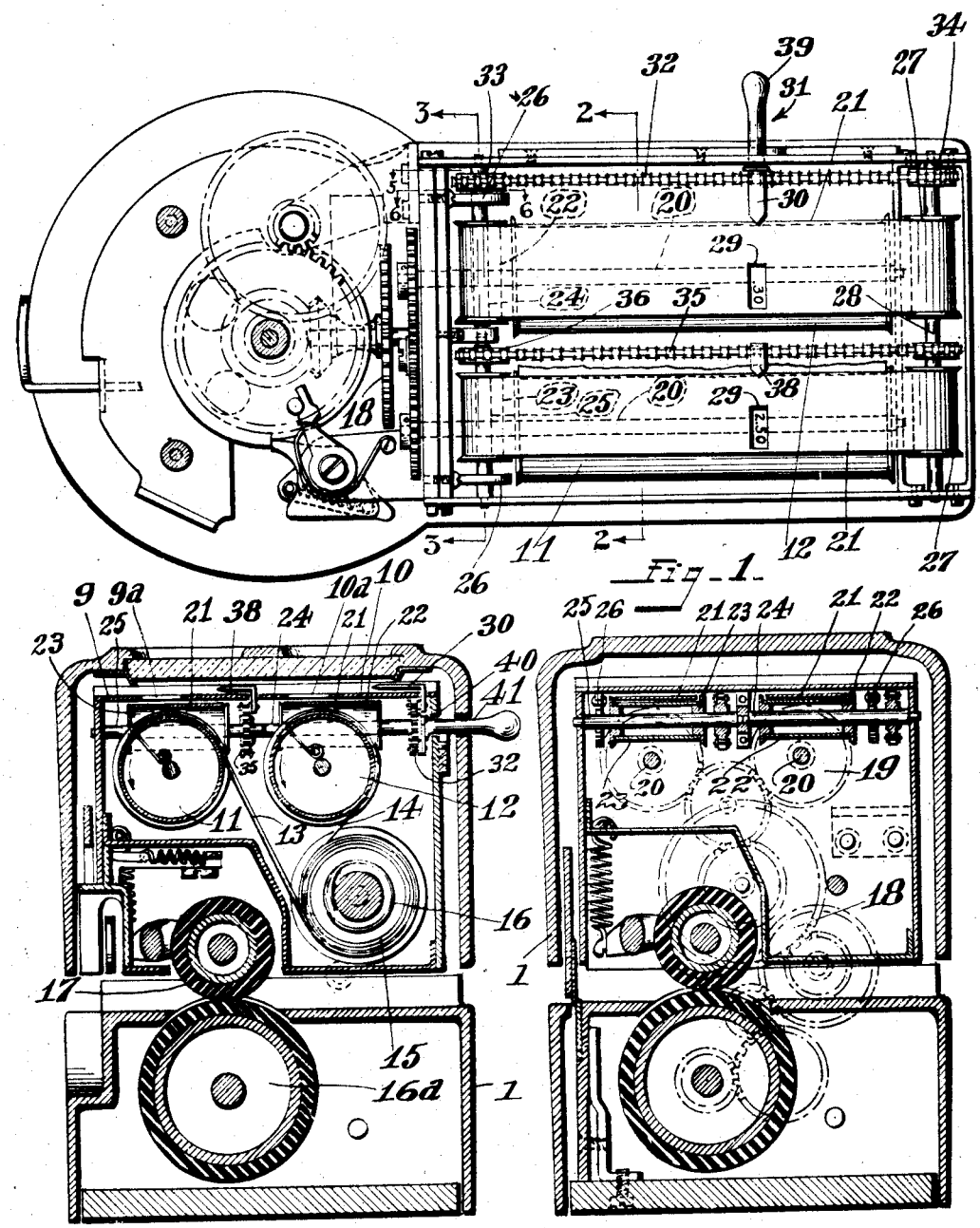

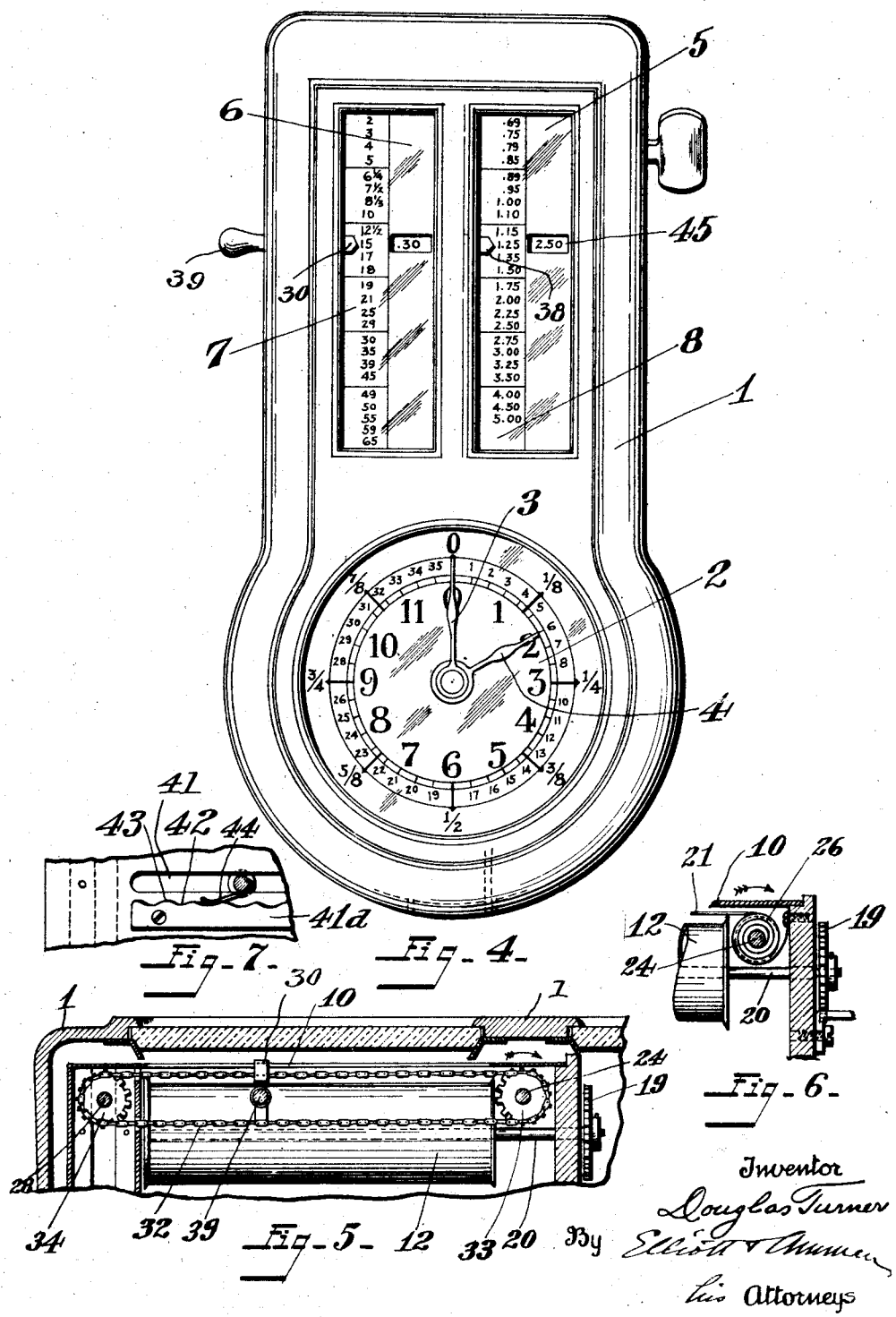

1,615,184

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

POINTING DEVICE FOR MEASURING AND COMPUTING MACHINES.

Application filed September 10, 1919. Serial No. 322,892.

This invention relates to machines carrying tabulated figures, for example, measuring or computing machines. While features of the invention may be applied to machines for various purposes, the invention is particularly applicable to measuring and cost computing machines, such as employed for measuring fabric, and computing the charge to be made by the salesman for the quantity of material measured by the machine.

The general object of the invention is to provide simple means for preventing errors in reading the figures on the indicating roller or chart.

In carrying out the invention, I provide a movable pointing device which co-operates with the fixed scale of the instrument, and with the tabulated cost figures of the indicating mechanism in such a way as to throw the figure to be read, into prominence, so that it will certainly be read, without any danger of accidentally reading another figure instead of it.

The invention consists in the novel features, and in the general combination of parts to be particularly described hereinafter, all of which contribute to produce a simple and efficient pointing device for measuring and computing machines. A preferred embodiment of my invention will be particularly described in the following specification, while the broad scope of my invention will be pointed out in the appended claim.

In the drawing,

Figure 1 is a plan of a fabric measuring and cost computing machine to which my invention has been applied, and showing the same with the cover plates removed so as to illustrate the parts of my improvement;

Figure 2 is a vertical section taken about on the line 2—2 of Figure 1.

Figure 3 is a vertical section taken about on the line 3—3 of Figure 1;

Figure 4 is a plan of the complete instrument;

Figure 5 is a longitudinal section through the upper part of the instrument illustrating details of the improvement;

Figure 6 is a vertical section further illustrating details of the improvement; and Figure 7 is a side elevation showing a portion of the outside of the inner case of the instrument, and further illustrating details of my improvement.

The casing 1, of the instrument or measuring machine is provided at one end with a dial 2, (see Fig. 4), for indicating units of measure such as yards, also fractions of a yard and inches. Over this dial, hands or pointers 3 and 4 move, being driven by the cloth or fabric when it is drawn through the instrument.

The upper side of the machine or instrument also includes two windows 5 and 6 adjacent to which, fixed scales 7 and 8 are provided. These scales carry figures indicating different prices per unit of measure, such as a yard.

The scales 7 and 8 are formed respectively on fixed plates 9 and 10, and the plate 9 carries a longitudinal slot or opening $9^a$, while the plate 10 carries a corresponding opening $10^a$. These slots $9^a$ and $10^a$ are parallel with their corresponding scales and are disposed directly over movable indicating members which may be in the form of rollers 11 and 12. These rollers are rotated by the measuring movement when the instrument is measuring, and, if desired, tabulated figures may be applied directly to the surface of these rollers to indicate the charge to be made for the amount of cloth measured. Usually, however, the tabulated figures are placed upon webs or charts 13 and 14, (see Figure 2), which wind upon the surface of these rollers. When the indicating mechanism is in the zero position, the principal portions of these charts are wrapped upon a supply drum or roller 15 provided with a spring 16 which tends to rotate this drum in the direction which would wrap up the charts upon the drum.

These machines or instruments include a measuring roller which is rotated by the cloth in pulling it through the machine, and this measuring roller, through suitable mechanism, drives the indicating mechanism including the hands 3 and 4 and the rollers 11 and 12. In doing so the tabulated figures of the charts pass in succession beneath the slots $9^a$ and $10^a$.

The machine illustrated includes a measuring roller $16^a$ with which co-operates a presser roller 17, and the shaft of the measuring roller, through a suitable gear-train 18, (see Figure 3), drives gear-wheels 19 attached to the shafts 20 of the rollers 11 and 12.

The figures carried by the charts are disposed in rows aligning with and corresponding to the figures on the scales 7 and 8. In applying my invention to a machine such as that described above, I provide a pointing device which is movable along the scale so that its pointer may be aligned with any one of the figures on the scale, and opposite the pointer or indicating finger I provide means for throwing the aligning figure on the chart into prominence so that no other figure can be mistaken for it. I prefer to accomplish this by employing framing means which will give the effect of a frame around the aligning figure of the chart, and I prefer to do this in such a way that at the same time that this frame around the figure is formed, I conceal or screen the remaining figures of the chart so that they cannot be read at all. In this way, I preclude any possibility of making a mistake in reading the instrument.

In order to accomplish these results, I provide a movable screen preferably in the form of a flexible web or curtain 21. In fact I provide two of these curtains, one corresponding to each of the indicating rollers, or chart rollers 11 and 12. These curtains are supported so that they are extensible, that is to say, they may be pulled out so as to move across the rows of figures on the chart. For this purpose, the ends of the respective curtains are wrapped around curtain supply rollers or curtain drums 22 and 23, and these two rollers 22 and 23 are mounted respectively on aligning shafts 24 and 25. The shaft of each of these rollers is provided with a coil spring 26, (see Figure 6), which tends to rotate the shaft of the roller in the direction to wrap the curtain upon the roller. These springs tend to return the curtains after they have been extended and keep the curtains taut. The outer ends of the curtains are wrapped about take-up rollers 27 which are also in alignment with each other, and carried rigidly by a common shaft 28. Each curtain is provided with a sight-opening 29, and these sight-openings are in alignment with each other; furthermore, they are also in alignment with an indicating finger or pointer 30 which constitutes part of a manually operated pointing device 31 which is movable longitudinally of the scales.

The pointing device 31 is connected with means movably mounted in the casing and extending longitudinally with the scale for operating the curtains in such a way as to move them to and fro when the pointing device is moved to and fro along the scales. In order to accomplish this, the pointing device is attached to one side of an endless chain 32 which runs around sprocket wheels 33 and 34, the former of which is carried on the shaft 24, the latter being carried on the shaft 28. The sprocket wheel 33 is loose on the shaft 24, but the sprocket wheel 34 is rigid with the shaft 28. A similar sprocket chain 35 is provided running parallel with the chain 32 and passing around the sprocket wheel 36 on the shaft 25. The sprocket chain 35 is for the purpose of carrying a pointer 38 which is in alignment with the finger or indicating pointer 30. The pointing device 31 is mounted so as to move along the scales and when it is so moved, the chain 32 rotates the shaft 28, thereby rotating the take-up rollers 27 which pull the curtains and unwrap them from the curtain rollers 24 and 25, as the sight-openings 29 move across above the rows of figures on the charts in maintaining their alignment with the pointers 30 and 38.

With this organization of parts, it is evident that if the pointer 30 is aligned with any figure of the scale, the co-operating window 29 will expose the figure on the chart which is in alignment with the pointer 30, and the curtain will conceal all of the other numbers on that chart.

The scale 8 is of the same character as the scale 7, that is to say, it simply represents a series of higher prices than those indicated on the scale 7, and hence it is evident that in any one alignment of the pointing device, the instrument will give two readings, however, there is no danger of confusing the reading opposite one scale with the reading opposite the other scale, and for this reason I have connected the pointer 38 up as a part of the pointing device 31. However, it is evident that, if desired, an independently movable pointer could be associated with each chart.

The pointing device is preferably moved along by means of a handle or knob 39, the inner end of which is attached to the chain by means of a bracket plate 40, (see Figure 2), and the outer end of which extends out through a slot 41 in the side wall of the case, and forms a handle accessible to the operator of the machine.

I provide means for yieldingly holding the pointers 30 and 38 in exact alignment with the figures of the scales. For this purpose, I prefer to provide the outer side of the wall of the case with a horizontal rack 41ª having a wavy upper edge presenting notches or depressions 42, and projections 43 between the depressions. The knob 39 carries a brake in the form of a small leaf spring 44 which yieldingly engages in the depressions or notches 42, and this spring is of sufficient force to hold the pointing device in any desired position against the force of the springs 26 of the curtain rollers 22 and 23.

In the mode of operation of the device, the operator of the instrument simply sets the pointing device 31 so that the pointer 30 or the pointer 38 is opposite the number indicating the price of the goods to be sold. The instrument having been set to the zero position, the fabric or cloth to be measured is then pulled through the machine, which operation advances the hands 3 and 4. Suppose, for example, that the customer desires two yards of cloth or ribbon at the price of $1.25 per yard. The pointing device would be set as indicated in Figure 4, and when the hands 3 and 4 indicate 2 yards as shown in Figure 4, then the charge of $2.50 is indicated in the row 45 of the tabulated figures.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent is:

In a measuring or computing machine, the combination of indicating mechanism including a movable indicating member carrying tabulated figures, a screen movably mounted adjacent to said indicating member for concealing the figures carried thereby and having a sight opening through which any one of the tabulated figures may be seen, a fixed scale adjacent to the movable indicating member, and pointing means movable with the screen aligning with the sight opening for indicating one of the numbers on the scale.

In testimony whereof, I have hereunto set my hand.

DOUGLAS TURNER.